Aug. 7, 1934.  J. C. GRAF  1,968,826
BELT PRESS
Filed Nov. 19, 1930
Fig. 1.
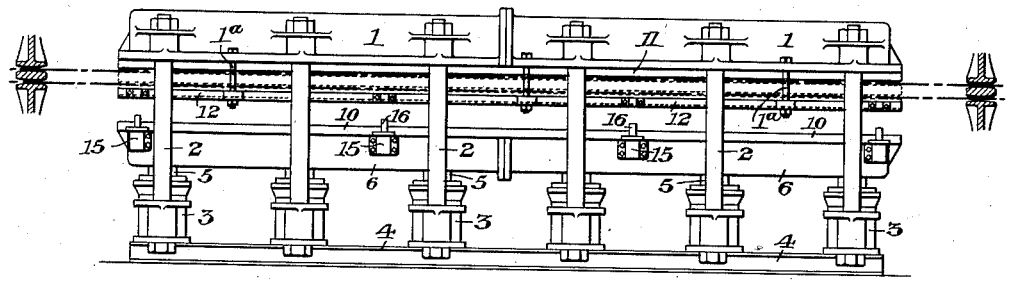
Fig. 2.
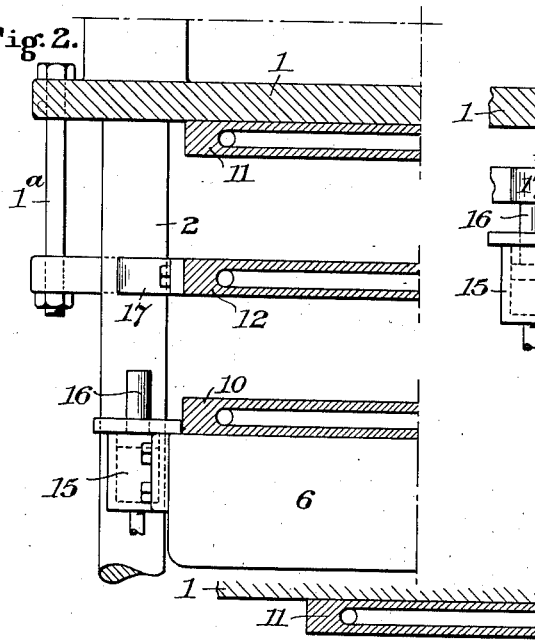
Fig. 3.
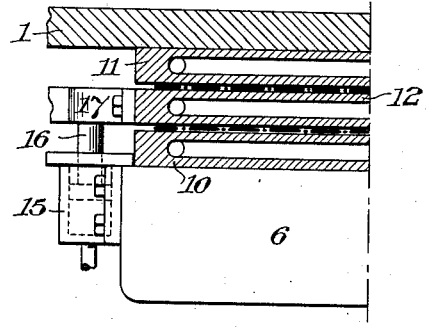
Fig. 5.
Fig. 4.
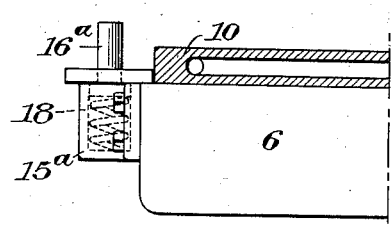
INVENTOR:
John C. Graf
by Murray C. Boyer
Atty.

Patented Aug. 7, 1934

1,968,826

UNITED STATES PATENT OFFICE 1,968,826

BELT PRESS

John C. Graf, Philadelphia, Pa., assignor, by mesne assignments, to Baldwin-Southwark Corporation, a corporation of Delaware Application November 19, 1930, Serial No. 496,640

8 Claims. (Cl. 18—17)

In the curing and/or vulcanizing of rubber belts it is necessary to subject the belt to stretch before the curing operation. The common practice is to provide a press capable of curing a plurality of belts at one operation, usually two, and the normal practice is to provide the holding means and the stretching element substantially in line with the under side of the upper platen in order to impart tension in a straight line to the belt and effect the desired stretch. A second belt will hug the under side of its upper platen which may be the intermediate platen of three, but as the normal position of this platen is some distance from upper and lower platens above and below the same, the portions of a second belt beyond the platens will lie in an angular position with respect to the stretching means. Hence, no matter to what extent the stretch has been effected there will be slack in the lower belt (or belts) when the platens are brought to the pressing and/or curing position.

The object of this invention is to avoid this condition and to arrange for stretch of all of the belts in a substantially straight line so that when the platens are brought together there will be no slack to be taken up or react upon the belts particularly a lower one, and render the tension of the same different from that of a belt or belts disposed above the same.

These and other features of my invention are more fully described hereinafter; reference being had to the accompanying drawing, in which:

Figure 1 is an elevation of a belt press having and containing the features forming the subject of my invention.

Figs. 2 and 3 are sectional views illustrating a detail of my invention.

Fig. 4 is a view similar to Fig. 2, illustrating a modification within the scope of my invention, and Figure 5 illustrates another modification within the scope of my invention.

The press may comprise a longitudinal frame consisting of an upper head or platen 1 supported by columns 2 from lower base members 3 which are in turn mounted upon I-beams 4 extending the length of the machine. These machines are of various sizes and may range from a few feet to twenty-five (25) or more feet in length, and in various widths. Each of the base members 3 includes a cylinder, and the several cylinders contain suitable rams 5 operatively connected to the lower platen 6; means being provided whereby these rams may operate simultaneously and lift the lower platen in a perfectly level condition. The lower platen carries a hot plate 10. The upper cross head or platen also carries a hot plate 11, and one or more hot plates 12, (one in the present instance) may be interposed between the plates 10 and 11. The hot plate 12 may be freely supported by bolts or other supports 1a hung from the upper head or platen 1, so as to be free to lift with respect to such head.

In carrying out my invention, I provide means whereby the hot plates may be brought to and held in a relatively close position during the stretching operation and before they are brought into close contact for the pressing and curing operation. For this purpose I may provide the lower movable platen 6, connected to the rams 5, with small constant pressure cylinders 15 having pistons 16 adapted to engage the intermediate hot plate 12 when the lower platen is lifted. The weight of this hot plate 12 is such that the pistons 16 will be partially compressed in their cylinders against the pressure tending to raise them and in consequence such plate 12 may be held in the position indicated in Fig. 3, with respect to the plate 10.

As the lower platen 6 continues to rise it will lift the plates 10 and 12 until the space between the plates 11 and 12 is substantially equal to that between the plates 10 and 12, also as indicated in Fig. 3. In such position there is sufficient space for free movement of the belts during the stretching operation and the relation of the belts to the hot plates, as clearly indicated in Fig. 1, is that they are being stretched in a substantially straight line, with the result that the conditions attending the stretching, pressing and curing of each belt are substantially the same; avoiding the slackness heretofore present when it was necessary to dispose the ends of certain belts at an angle during the stretching operation.

Preferably, the hot plate 12 carries attached pieces 17 which are engaged by the pistons 16. In this way the hot plates may be temporarily held in spaced relation; which spacing is sufficient to permit free movement of the belts during the stretching operation and then after the stretching operation has been completed, full pressure may be applied to the main cylinders whereby the rams 5 may lift the lower platen and compress the several hot plates together with the belts between the same. It will be understood, of course, that the constant pressure sufficient to maintain the spaced relation between the hot plates 10 and 12 is readily overcome by the pressure acting upon the rams 5 to lift the lower platen.

In lieu of the use of the small constant pressure cylinders to engage an intermediate hot plate and provide for its spaced relation with respect to a lower hot plate, coiled springs 18 may be employed which, of course, will be compressed when the lower platen is lifted to bring the hot plates in compressing relation with the belts or other interposed bodies.

These springs may be mounted in the cylinders indicated at 15ª, in the manner indicated in Fig. 4, where one is shown as supporting a piston 16ª. Another arrangement would be the placement of coiled springs of proper tension in open cups, such as indicated in Fig. 5 in such position as to underlie the brackets 17. In all instances the springs will be capable of supporting the hot plate in a position such as that illustrated in Fig. 3, before the plates are brought to final position in close contact with the interposed belts or other bodies.

I claim:

1. In a press of the multiple hot plate type, the combination of a plurality of hot plates between which material may be compressed and wherein certain of said plates are movable with respect to others, means for moving said hot plates, and means whereby temporary separation may be maintained between a plurality of said movable plates after they have been moved and before they are finally engaged with interposed material.

2. In a press of the multiple hot plate type, the combination with a plurality of hot plates between which material may be compressed and wherein certain of said plates are movable with respect to others, of means for moving said hot plates, and means whereby temporary separation may be maintained between a plurality of said movable plates after they have been moved and before they are finally engaged with material undergoing compression and heat treatment.

3. In a multiple hot plate press, the combination of an upper fixed hot plate, a lower hot plate, an intermediate plate; said lower and intermediate hot plates being movably mounted with respect to the fixed plate, and compressible means whereby said intermediate plate may be held in a temporarily separated position with respect to the lower hot plate.

4. In a belt press, the combination of an upper fixed hot plate, a lower hot plate, an intermediate plate; said lower and intermediate hot plates being movably mounted with respect to the fixed plate, and compressible means whereby said intermediate plate may be held in a temporarily separated position with respect to the lower hot plate during a stretching operation imparted to a belt disposed between said hot plates.

5. In a multiple hot plate press, the combination of a frame, a plurality of platens supported thereby, one of said platens being movable with respect to the other, hot plates supported by said platens, an intermediate hot plate freely supported between the hot plates carried by the platens, and compressible means carried by the lower platen and adapted to engage the intermediate hot plate and maintain it temporarily separated from the hot plate carried by the lower platen.

6. In a belt press, the combination of a frame, a plurality of platens supported thereby, one of said platens being movable with respect to the other, hot plates supported by said platens, an intermediate hot plate freely supported between the hot plates carried by the platens, and compressible means carried by the lower platen, adapted to engage the intermediate hot plate and maintain it temporarily separated from the hot plate carried by the lower platen during a stretching operation imparted to a belt supported on said intermediate hot plate.

7. In a multiple hot plate press, the combination of a frame, a plurality of platens supported thereby, one of said platens being movable with respect to the other, hot plates supported by said platens, an intermediate hot plate freely supported between the hot plates carried by the platens, a plurality of constant pressure cylinders carried by the lower platen, and pistons therein adapted to engage the intermediate hot plate and maintain it temporarily separated from the hot plate carried by the lower platen.

8. In a belt press, the combination of a frame, a plurality of platens supported thereby, one of said platens being movable with respect to the other, hot plates supported by said platens, an intermediate hot plate freely supported between the hot plates carried by the platens, a plurality of constant pressure cylinders carried by the lower platen and pistons therein adapted to engage the intermediate hot plate and maintain it temporarily separated from the hot plate carried by the lower platen during a stretching operation imparted to the belt supported on said intermediate hot plate.

JOHN C. GRAF.